United States Patent
Wang et al.

(10) Patent No.: US 12,448,610 B2
(45) Date of Patent: *Oct. 21, 2025

(54) PREPARATION OF GLYCOSYLTRANSFERASE UGT76G1 MUTANT AND USE THEREOF

(71) Applicant: CAS Center for Excellence in Molecular Plant Sciences, Shanghai (CN)

(72) Inventors: Yong Wang, Shanghai (CN); Yuwei Sun, Shanghai (CN); Zhifeng Liu, Shanghai (CN); Zhuo Chen, Shanghai (CN); Jianhua Li, Shanghai (CN); Haili Liu, Shanghai (CN); Huajun Lv, Shanghai (CN)

(73) Assignee: CAS Center for Excellence in Molecular Plant Sciences, Shanghai (CN)

(*) Notice: Subject to any disclaimer, the term of this patent is extended or adjusted under 35 U.S.C. 154(b) by 634 days.

This patent is subject to a terminal disclaimer.

(21) Appl. No.: 17/762,869

(22) PCT Filed: Sep. 25, 2020

(86) PCT No.: PCT/CN2020/117818
§ 371 (c)(1),
(2) Date: Mar. 23, 2022

(87) PCT Pub. No.: WO2021/057913
PCT Pub. Date: Apr. 1, 2021

(65) Prior Publication Data
US 2022/0275351 A1 Sep. 1, 2022

(30) Foreign Application Priority Data
Sep. 26, 2019 (CN) .......................... 201910918850.2

(51) Int. Cl.
*C12N 9/10* (2006.01)

(52) U.S. Cl.
CPC .................................. *C12N 9/1051* (2013.01)

(58) Field of Classification Search
CPC .... C12N 9/1051; C12N 15/70; C12N 9/1048; C12N 15/63; C12P 17/162; C12P 19/56
See application file for complete search history.

(56) References Cited

U.S. PATENT DOCUMENTS

2018/0223264 A1* 8/2018 Vroom .................. C12P 19/18

FOREIGN PATENT DOCUMENTS

| CN | 105051195 A | 11/2015 |
| CN | 106795523 A | 5/2017 |

(Continued)

OTHER PUBLICATIONS

C7EA09 (UniProt Database, 2009) (Year: 2009).*

(Continued)

*Primary Examiner* — Robert B Mondesi
*Assistant Examiner* — Naghmeh Nina Moazzami (57) ABSTRACT

Provided are a glycosyltransferase UGT76G1 mutant, an isolated polynucleotide, a carrier, a production method, and a composition and a kit for the glycosylation of substrates. Further provided are a method for increasing the catalytic activity of the glycosyltransferase UGT76G1 mutant, and a method for promoting the glycosylation of flavone compounds and the use thereof. The glycosyltransferase UGT76G1 mutant is subjected to mutations at positions corresponding to positions 87, 199, 204 or 379 of SEQ ID NO: 1, and significantly improves the transformation activity of substrates of the flavone compounds.

12 Claims, 4 Drawing Sheets
Specification includes a Sequence Listing.

(56) References Cited

FOREIGN PATENT DOCUMENTS

| CN | 107109453 A | 8/2017 |
|---|---|---|
| WO | 2014122227 A2 | 8/2014 |
| WO | 2016028899 A1 | 2/2016 |
| WO | 2019177634 A1 | 9/2019 |
| WO | 2020249138 A1 | 12/2020 |

OTHER PUBLICATIONS

Liu et al. Structural Insights into the CatalyticMechanism of a Plant Diterpene Glycosyltransferase SrUGT76G1, Plant Communications 1, 100004, Jan. 2020 (Year: 2020).*

Yang et al. "Base substitution mutations in uridinediphosphate-dependent glycosyltransferase 76G1 gene of *Stevia rebaudiana* causes the low levels of rebaudioside A Mutations in UGT76G1, A key gene of steviol glycosides synthesis" Plant Physiology and Biochemistry 80 (2014) 220-225.

Lee et al. "Molecular basis for branched steviol glucoside biosynthesis" PNAS, Jun. 25, 2019, vol. 116, No. 26, 13131-13136.

Petit et al. "UGT76G1 polymorphism in Stevia rebaudiana: New variants for steviol glycosides conjugation". Plant Physiology and Biochemistry 135 (2019) 563-569.

DATABASE Geneseq [Online]. Apr. 21, 2016 "Stevia rebaudiana UGT76GI protein mutant L379G" XP002810091, retrieved from EBI accession No. GSP:BCM74426. Database accession No. BCM74426 *abstract*.

DATABASE Geneseq [Online], Apr. 21, 2016 (Apr. 21, 2016), "Stevia rebaudiana UGT76GI protein mutant A239I/L379A/V394I" XP002810094, retrieved from EBI accession No. GSP:BCM74166 Database accession No. BCM74166 *abstract*.

DATABASE Geneseq [Online], Oct. 9, 2014 (Oct. 9, 2014), "Stevia rebaudiana UGT76GI protein variant L379V", XP002810092, retrieved from EBI accession No. GSP:BBL52213, Database accession No. BBL52213 *abstract*.

DATABASE Geneseq [Online], Oct. 9, 2014 (Oct. 9, 2014), "Stevia rebaudiana UGT76GI protein variant L379V", XP002810095, retrieved from EBI accession No. GSP:BBL52166. Database accession No. BBL52166 *abstract*.

Sep. 19, 2023 (EP) Extended European Search Report Application No. 20869418.2.

* cited by examiner

SEQUENCE LISTING

<160> NUMBER OF SEQ ID NOS: 15

<210> SEQ ID NO 1
<211> LENGTH: 458
<212> TYPE: PRT
<213> ORGANISM: Artificial
<220> FEATURE:
<223> OTHER INFORMATION: Stevia rebaudiana

<400> SEQUENCE: 1

Met Glu Asn Lys Thr Glu Thr Thr Val Arg Arg Arg Arg Ile Ile
1               5                   10                  15

Leu Phe Pro Val Pro Phe Gln Gly His Ile Asn Pro Ile Leu Gln Leu

```
                    20                  25                  30
Ala Asn Val Leu Tyr Ser Lys Gly Phe Ser Ile Thr Ile Phe His Thr
                35                  40                  45
Asn Phe Asn Lys Pro Lys Thr Ser Asn Tyr Pro His Phe Thr Phe Arg
 50                  55                  60
Phe Ile Leu Asp Asn Asp Pro Gln Asp Glu Arg Ile Ser Asn Leu Pro
 65                  70                  75                  80
Thr His Gly Pro Leu Ala Gly Met Arg Ile Pro Ile Ile Asn Glu His
                85                  90                  95
Gly Ala Asp Glu Leu Arg Arg Glu Leu Glu Leu Leu Met Leu Ala Ser
                100                 105                 110
Glu Glu Asp Glu Glu Val Ser Cys Leu Ile Thr Asp Ala Leu Trp Tyr
                115                 120                 125
Phe Ala Gln Ser Val Ala Asp Ser Leu Asn Leu Arg Arg Leu Val Leu
                130                 135                 140
Met Thr Ser Ser Leu Phe Asn Phe His Ala His Val Ser Leu Pro Gln
145                 150                 155                 160
Phe Asp Glu Leu Gly Tyr Leu Asp Pro Asp Asp Lys Thr Arg Leu Glu
                165                 170                 175
Glu Gln Ala Ser Gly Phe Pro Met Leu Lys Val Lys Asp Ile Lys Ser
                180                 185                 190
Ala Tyr Ser Asn Trp Gln Ile Leu Lys Glu Ile Leu Gly Lys Met Ile
                195                 200                 205
Lys Gln Thr Lys Ala Ser Ser Gly Val Ile Trp Asn Ser Phe Lys Glu
                210                 215                 220
Leu Glu Glu Ser Glu Leu Glu Thr Val Ile Arg Glu Ile Pro Ala Pro
225                 230                 235                 240
Ser Phe Leu Ile Pro Leu Pro Lys His Leu Thr Ala Ser Ser Ser Ser
                245                 250                 255
Leu Leu Asp His Asp Arg Thr Val Phe Gln Trp Leu Asp Gln Gln Pro
                260                 265                 270
Pro Ser Ser Val Leu Tyr Val Ser Phe Gly Ser Ser Ser Glu Val Asp
                275                 280                 285
Glu Lys Asp Phe Leu Glu Ile Ala Arg Gly Leu Val Asp Ser Lys Gln
                290                 295                 300
Ser Phe Leu Trp Val Val Arg Pro Gly Phe Val Lys Gly Ser Thr Trp
305                 310                 315                 320
Val Glu Pro Leu Pro Asp Gly Phe Leu Gly Glu Arg Gly Arg Ile Val
                325                 330                 335
Lys Trp Val Pro Gln Gln Glu Val Leu Ala His Gly Ala Ile Gly Ala
                340                 345                 350
Phe Trp Thr His Ser Gly Trp Asn Ser Thr Leu Glu Ser Val Cys Glu
                355                 360                 365
Gly Val Pro Met Ile Phe Ser Asp Phe Gly Leu Asp Gln Pro Leu Asn
                370                 375                 380
Ala Arg Tyr Met Ser Asp Val Leu Lys Val Gly Val Tyr Leu Glu Asn
385                 390                 395                 400
Gly Trp Glu Arg Gly Glu Ile Ala Asn Ala Ile Arg Arg Val Met Val
                405                 410                 415
Asp Glu Glu Gly Glu Tyr Ile Arg Gln Asn Ala Arg Val Leu Lys Gln
                420                 425                 430
Lys Ala Asp Val Ser Leu Met Lys Gly Gly Ser Ser Tyr Glu Ser Leu
                435                 440                 445
```

```
Glu Ser Leu Val Ser Tyr Ile Ser Ser Leu
    450                 455

<210> SEQ ID NO 2
<211> LENGTH: 458
<212> TYPE: PRT
<213> ORGANISM: Artificial
<220> FEATURE:
<223> OTHER INFORMATION: Variant

<400> SEQUENCE: 2

Met Glu Asn Lys Thr Glu Thr Thr Val Arg Arg Arg Arg Ile Ile
1               5                   10                  15

Leu Phe Pro Val Pro Phe Gln Gly His Ile Asn Pro Ile Leu Gln Leu
                20                  25                  30

Ala Asn Val Leu Tyr Ser Lys Gly Phe Ser Ile Thr Ile Phe His Thr
            35                  40                  45

Asn Phe Asn Lys Pro Lys Thr Ser Asn Tyr Pro His Phe Thr Phe Arg
50                  55                  60

Phe Ile Leu Asp Asn Asp Pro Gln Asp Glu Arg Ile Ser Asn Leu Pro
65                  70                  75                  80

Thr His Gly Pro Leu Ala Phe Met Arg Ile Pro Ile Ile Asn Glu His
                85                  90                  95

Gly Ala Asp Glu Leu Arg Arg Glu Leu Glu Leu Leu Met Leu Ala Ser
            100                 105                 110

Glu Glu Asp Glu Glu Val Ser Cys Leu Ile Thr Asp Ala Leu Trp Tyr
        115                 120                 125

Phe Ala Gln Ser Val Ala Asp Ser Leu Asn Leu Arg Arg Leu Val Leu
130                 135                 140

Met Thr Ser Ser Leu Phe Asn Phe His Ala His Val Ser Leu Pro Gln
145                 150                 155                 160

Phe Asp Glu Leu Gly Tyr Leu Asp Pro Asp Asp Lys Thr Arg Leu Glu
                165                 170                 175

Glu Gln Ala Ser Gly Phe Pro Met Leu Lys Val Lys Asp Ile Lys Ser
            180                 185                 190

Ala Tyr Ser Asn Trp Gln Ile Leu Lys Glu Ile Leu Gly Lys Met Ile
        195                 200                 205

Lys Gln Thr Lys Ala Ser Ser Gly Val Ile Trp Asn Ser Phe Lys Glu
210                 215                 220

Leu Glu Glu Ser Glu Leu Glu Thr Val Ile Arg Glu Ile Pro Ala Pro
225                 230                 235                 240

Ser Phe Leu Ile Pro Leu Pro Lys His Leu Thr Ala Ser Ser Ser Ser
                245                 250                 255

Leu Leu Asp His Asp Arg Thr Val Phe Gln Trp Leu Asp Gln Gln Pro
            260                 265                 270

Pro Ser Ser Val Leu Tyr Val Ser Phe Gly Ser Ser Ser Glu Val Asp
        275                 280                 285

Glu Lys Asp Phe Leu Glu Ile Ala Arg Gly Leu Val Asp Ser Lys Gln
290                 295                 300

Ser Phe Leu Trp Val Val Arg Pro Gly Phe Val Lys Gly Ser Thr Trp
305                 310                 315                 320

Val Glu Pro Leu Pro Asp Gly Phe Leu Gly Glu Arg Gly Arg Ile Val
                325                 330                 335

Lys Trp Val Pro Gln Gln Glu Val Leu Ala His Gly Ala Ile Gly Ala
            340                 345                 350
```

```
Phe Trp Thr His Ser Gly Trp Asn Ser Thr Leu Glu Ser Val Cys Glu
            355                 360                 365

Gly Val Pro Met Ile Phe Ser Asp Phe Gly Leu Asp Gln Pro Leu Asn
            370                 375                 380

Ala Arg Tyr Met Ser Asp Val Leu Lys Val Gly Val Tyr Leu Glu Asn
385                 390                 395                 400

Gly Trp Glu Arg Gly Glu Ile Ala Asn Ala Ile Arg Arg Val Met Val
            405                 410                 415

Asp Glu Glu Gly Glu Tyr Ile Arg Gln Asn Ala Arg Val Leu Lys Gln
            420                 425                 430

Lys Ala Asp Val Ser Leu Met Lys Gly Gly Ser Ser Tyr Glu Ser Leu
            435                 440                 445

Glu Ser Leu Val Ser Tyr Ile Ser Ser Leu
            450                 455

<210> SEQ ID NO 3
<211> LENGTH: 458
<212> TYPE: PRT
<213> ORGANISM: Artificial
<220> FEATURE:
<223> OTHER INFORMATION: Variant

<400> SEQUENCE: 3

Met Glu Asn Lys Thr Glu Thr Thr Val Arg Arg Arg Arg Arg Ile Ile
1               5                   10                  15

Leu Phe Pro Val Pro Phe Gln Gly His Ile Asn Pro Ile Leu Gln Leu
            20                  25                  30

Ala Asn Val Leu Tyr Ser Lys Gly Phe Ser Ile Thr Ile Phe His Thr
            35                  40                  45

Asn Phe Asn Lys Pro Lys Thr Ser Asn Tyr Pro His Phe Thr Phe Arg
        50                  55                  60

Phe Ile Leu Asp Asn Asp Pro Gln Asp Glu Arg Ile Ser Asn Leu Pro
65                  70                  75                  80

Thr His Gly Pro Leu Ala Gly Met Arg Ile Pro Ile Ile Asn Glu His
                85                  90                  95

Gly Ala Asp Glu Leu Arg Arg Glu Leu Glu Leu Leu Met Leu Ala Ser
            100                 105                 110

Glu Glu Asp Glu Glu Val Ser Cys Leu Ile Thr Asp Ala Leu Trp Tyr
            115                 120                 125

Phe Ala Gln Ser Val Ala Asp Ser Leu Asn Leu Arg Arg Leu Val Leu
        130                 135                 140

Met Thr Ser Ser Leu Phe Asn Phe His Ala His Val Ser Leu Pro Gln
145                 150                 155                 160

Phe Asp Glu Leu Gly Tyr Leu Asp Pro Asp Lys Thr Arg Leu Glu
            165                 170                 175

Glu Gln Ala Ser Gly Phe Pro Met Leu Lys Val Lys Asp Ile Lys Ser
            180                 185                 190

Ala Tyr Ser Asn Trp Gln Phe Leu Lys Glu Ile Leu Gly Lys Met Ile
            195                 200                 205

Lys Gln Thr Lys Ala Ser Ser Gly Val Ile Trp Asn Ser Phe Lys Glu
        210                 215                 220

Leu Glu Glu Ser Glu Leu Glu Thr Val Ile Arg Glu Ile Pro Ala Pro
225                 230                 235                 240

Ser Phe Leu Ile Pro Leu Pro Lys His Leu Thr Ala Ser Ser Ser Ser
                245                 250                 255
```

```
Leu Leu Asp His Asp Arg Thr Val Phe Gln Trp Leu Asp Gln Gln Pro
            260                 265                 270

Pro Ser Ser Val Leu Tyr Val Ser Phe Gly Ser Ser Glu Val Asp
            275                 280                 285

Glu Lys Asp Phe Leu Glu Ile Ala Arg Gly Leu Val Asp Ser Lys Gln
            290                 295                 300

Ser Phe Leu Trp Val Val Arg Pro Gly Phe Val Lys Gly Ser Thr Trp
305                 310                 315                 320

Val Glu Pro Leu Pro Asp Gly Phe Leu Gly Glu Arg Gly Arg Ile Val
                325                 330                 335

Lys Trp Val Pro Gln Gln Glu Val Leu Ala His Gly Ala Ile Gly Ala
            340                 345                 350

Phe Trp Thr His Ser Gly Trp Asn Ser Thr Leu Glu Ser Val Cys Glu
            355                 360                 365

Gly Val Pro Met Ile Phe Ser Asp Phe Gly Leu Asp Gln Pro Leu Asn
            370                 375                 380

Ala Arg Tyr Met Ser Asp Val Leu Lys Val Gly Val Tyr Leu Glu Asn
385                 390                 395                 400

Gly Trp Glu Arg Gly Glu Ile Ala Asn Ala Ile Arg Arg Val Met Val
                405                 410                 415

Asp Glu Glu Gly Glu Tyr Ile Arg Gln Asn Ala Arg Val Leu Lys Gln
            420                 425                 430

Lys Ala Asp Val Ser Leu Met Lys Gly Gly Ser Ser Tyr Glu Ser Leu
            435                 440                 445

Glu Ser Leu Val Ser Tyr Ile Ser Ser Leu
            450                 455
```

<210> SEQ ID NO 4
<211> LENGTH: 458
<212> TYPE: PRT
<213> ORGANISM: Artificial
<220> FEATURE:
<223> OTHER INFORMATION: Variant

<400> SEQUENCE: 4

```
Met Glu Asn Lys Thr Glu Thr Thr Val Arg Arg Arg Arg Arg Ile Ile
1               5                   10                  15

Leu Phe Pro Val Pro Phe Gln Gly His Ile Asn Pro Ile Leu Gln Leu
                20                  25                  30

Ala Asn Val Leu Tyr Ser Lys Gly Phe Ser Ile Thr Ile Phe His Thr
            35                  40                  45

Asn Phe Asn Lys Pro Lys Thr Ser Asn Tyr Pro His Phe Thr Phe Arg
50                  55                  60

Phe Ile Leu Asp Asn Asp Pro Gln Asp Glu Arg Ile Ser Asn Leu Pro
65                  70                  75                  80

Thr His Gly Pro Leu Ala Gly Met Arg Ile Pro Ile Ile Asn Glu His
                85                  90                  95

Gly Ala Asp Glu Leu Arg Arg Glu Leu Glu Leu Leu Met Leu Ala Ser
            100                 105                 110

Glu Glu Asp Glu Glu Val Ser Cys Leu Ile Thr Asp Ala Leu Trp Tyr
            115                 120                 125

Phe Ala Gln Ser Val Ala Asp Ser Leu Asn Leu Arg Arg Leu Val Leu
            130                 135                 140

Met Thr Ser Ser Leu Phe Asn Phe His Ala His Val Ser Leu Pro Gln
145                 150                 155                 160
```

```
Phe Asp Glu Leu Gly Tyr Leu Asp Pro Asp Lys Thr Arg Leu Glu
            165                 170                 175

Glu Gln Ala Ser Gly Phe Pro Met Leu Lys Val Lys Asp Ile Lys Ser
            180                 185                 190

Ala Tyr Ser Asn Trp Gln Ile Leu Lys Glu Ile Phe Gly Lys Met Ile
            195                 200                 205

Lys Gln Thr Lys Ala Ser Ser Gly Val Ile Trp Asn Ser Phe Lys Glu
            210                 215                 220

Leu Glu Glu Ser Glu Leu Glu Thr Val Ile Arg Glu Ile Pro Ala Pro
225                 230                 235                 240

Ser Phe Leu Ile Pro Leu Pro Lys His Leu Thr Ala Ser Ser Ser Ser
            245                 250                 255

Leu Leu Asp His Asp Arg Thr Val Phe Gln Trp Leu Asp Gln Gln Pro
            260                 265                 270

Pro Ser Ser Val Leu Tyr Val Ser Phe Gly Ser Ser Glu Val Asp
            275                 280                 285

Glu Lys Asp Phe Leu Glu Ile Ala Arg Gly Leu Val Asp Ser Lys Gln
            290                 295                 300

Ser Phe Leu Trp Val Val Arg Pro Gly Phe Val Lys Gly Ser Thr Trp
305                 310                 315                 320

Val Glu Pro Leu Pro Asp Gly Phe Leu Gly Glu Arg Gly Arg Ile Val
            325                 330                 335

Lys Trp Val Pro Gln Gln Glu Val Leu Ala His Gly Ala Ile Gly Ala
            340                 345                 350

Phe Trp Thr His Ser Gly Trp Asn Ser Thr Leu Glu Ser Val Cys Glu
            355                 360                 365

Gly Val Pro Met Ile Phe Ser Asp Phe Gly Leu Asp Gln Pro Leu Asn
            370                 375                 380

Ala Arg Tyr Met Ser Asp Val Leu Lys Val Gly Val Tyr Leu Glu Asn
385                 390                 395                 400

Gly Trp Glu Arg Gly Glu Ile Ala Asn Ala Ile Arg Arg Val Met Val
            405                 410                 415

Asp Glu Glu Gly Glu Tyr Ile Arg Gln Asn Ala Arg Val Leu Lys Gln
            420                 425                 430

Lys Ala Asp Val Ser Leu Met Lys Gly Gly Ser Ser Tyr Glu Ser Leu
            435                 440                 445

Glu Ser Leu Val Ser Tyr Ile Ser Ser Leu
    450                 455

<210> SEQ ID NO 5
<211> LENGTH: 458
<212> TYPE: PRT
<213> ORGANISM: Artificial
<220> FEATURE:
<223> OTHER INFORMATION: Variant

<400> SEQUENCE: 5

Met Glu Asn Lys Thr Glu Thr Thr Val Arg Arg Arg Arg Ile Ile
1               5                   10                  15

Leu Phe Pro Val Pro Phe Gln Gly His Ile Asn Pro Ile Leu Gln Leu
            20                  25                  30

Ala Asn Val Leu Tyr Ser Lys Gly Phe Ser Ile Thr Ile Phe His Thr
            35                  40                  45

Asn Phe Asn Lys Pro Lys Thr Ser Asn Tyr Pro His Phe Thr Phe Arg
    50                  55                  60
```

```
Phe Ile Leu Asp Asn Asp Pro Gln Asp Glu Arg Ile Ser Asn Leu Pro
 65                  70                  75                  80

Thr His Gly Pro Leu Ala Gly Met Arg Ile Pro Ile Ile Asn Glu His
                 85                  90                  95

Gly Ala Asp Glu Leu Arg Arg Glu Leu Glu Leu Leu Met Leu Ala Ser
            100                 105                 110

Glu Glu Asp Glu Glu Val Ser Cys Leu Ile Thr Asp Ala Leu Trp Tyr
        115                 120                 125

Phe Ala Gln Ser Val Ala Asp Ser Leu Asn Leu Arg Arg Leu Val Leu
    130                 135                 140

Met Thr Ser Ser Leu Phe Asn Phe His Ala His Val Ser Leu Pro Gln
145                 150                 155                 160

Phe Asp Glu Leu Gly Tyr Leu Asp Pro Asp Asp Lys Thr Arg Leu Glu
                165                 170                 175

Glu Gln Ala Ser Gly Phe Pro Met Leu Lys Val Lys Asp Ile Lys Ser
            180                 185                 190

Ala Tyr Ser Asn Trp Gln Ile Leu Lys Glu Ile Leu Gly Lys Met Ile
        195                 200                 205

Lys Gln Thr Lys Ala Ser Ser Gly Val Ile Trp Asn Ser Phe Lys Glu
    210                 215                 220

Leu Glu Glu Ser Glu Leu Glu Thr Val Ile Arg Glu Ile Pro Ala Pro
225                 230                 235                 240

Ser Phe Leu Ile Pro Leu Pro Lys His Leu Thr Ala Ser Ser Ser Ser
                245                 250                 255

Leu Leu Asp His Asp Arg Thr Val Phe Gln Trp Leu Asp Gln Gln Pro
            260                 265                 270

Pro Ser Ser Val Leu Tyr Val Ser Phe Gly Ser Ser Ser Glu Val Asp
        275                 280                 285

Glu Lys Asp Phe Leu Glu Ile Ala Arg Gly Leu Val Asp Ser Lys Gln
    290                 295                 300

Ser Phe Leu Trp Val Val Arg Pro Gly Phe Val Lys Gly Ser Thr Trp
305                 310                 315                 320

Val Glu Pro Leu Pro Asp Gly Phe Leu Gly Arg Gly Arg Ile Val
                325                 330                 335

Lys Trp Val Pro Gln Gln Glu Val Leu Ala His Gly Ala Ile Gly Ala
            340                 345                 350

Phe Trp Thr His Ser Gly Trp Asn Ser Thr Leu Glu Ser Val Cys Glu
        355                 360                 365

Gly Val Pro Met Ile Phe Ser Asp Phe Gly Trp Asp Gln Pro Leu Asn
    370                 375                 380

Ala Arg Tyr Met Ser Asp Val Leu Lys Val Gly Val Tyr Leu Glu Asn
385                 390                 395                 400

Gly Trp Glu Arg Gly Glu Ile Ala Asn Ala Ile Arg Arg Val Met Val
                405                 410                 415

Asp Glu Glu Gly Glu Tyr Ile Arg Gln Asn Ala Arg Val Leu Lys Gln
            420                 425                 430

Lys Ala Asp Val Ser Leu Met Lys Gly Gly Ser Ser Tyr Glu Ser Leu
        435                 440                 445

Glu Ser Leu Val Ser Tyr Ile Ser Ser Leu
450                 455

<210> SEQ ID NO 6
<211> LENGTH: 25
```

-continued

```
<212> TYPE: DNA
<213> ORGANISM: Artificial
<220> FEATURE:
<223> OTHER INFORMATION: Primer

<400> SEQUENCE: 6
attctggatc catggaaaac aaaac                                    25

<210> SEQ ID NO 7
<211> LENGTH: 25
<212> TYPE: DNA
<213> ORGANISM: Artificial
<220> FEATURE:
<223> OTHER INFORMATION: Primer

<400> SEQUENCE: 7
cgcaagcttt taactttaca gagaa                                    25

<210> SEQ ID NO 8
<211> LENGTH: 30
<212> TYPE: DNA
<213> ORGANISM: Artificial
<220> FEATURE:
<223> OTHER INFORMATION: Primer

<400> SEQUENCE: 8
ggtccgctgg cgttcatgcg tatcccgatc                               30

<210> SEQ ID NO 9
<211> LENGTH: 24
<212> TYPE: DNA
<213> ORGANISM: Artificial
<220> FEATURE:
<223> OTHER INFORMATION: Primer

<400> SEQUENCE: 9
gaacgccagc ggaccgtggg tcgg                                     24

<210> SEQ ID NO 10
<211> LENGTH: 38
<212> TYPE: DNA
<213> ORGANISM: Artificial
<220> FEATURE:
<223> OTHER INFORMATION: Primer

<400> SEQUENCE: 10
gcgtactcta actggcagtt cctgaaagaa atcctggg                      38

<210> SEQ ID NO 11
<211> LENGTH: 36
<212> TYPE: DNA
<213> ORGANISM: Artificial
<220> FEATURE:
<223> OTHER INFORMATION: Primer

<400> SEQUENCE: 11
ctgccagtta gagtacgcag atttgatgtc tttaac                        36

<210> SEQ ID NO 12
<211> LENGTH: 44
<212> TYPE: DNA
<213> ORGANISM: Artificial
<220> FEATURE:
<223> OTHER INFORMATION: Primer

<400> SEQUENCE: 12
```

```
ggcagatcct gaaagaaatc ttcggtaaaa tgatcaaaca gacc                          44
```

```
<210> SEQ ID NO 13
<211> LENGTH: 30
<212> TYPE: DNA
<213> ORGANISM: Artificial
<220> FEATURE:
<223> OTHER INFORMATION: Primer

<400> SEQUENCE: 13
ctttcaggat ctgccagtta gagtacgcag                                         30
```

```
<210> SEQ ID NO 14
<211> LENGTH: 35
<212> TYPE: DNA
<213> ORGANISM: Artificial
<220> FEATURE:
<223> OTHER INFORMATION: Primer

<400> SEQUENCE: 14
cttctctgac ttcggttggg accagccgct gaacg                                   35
```

```
<210> SEQ ID NO 15
<211> LENGTH: 35
<212> TYPE: DNA
<213> ORGANISM: Artificial
<220> FEATURE:
<223> OTHER INFORMATION: Primer

<400> SEQUENCE: 15
accgaagtca gagaagatca tcggaacacc ttcgc                                   35
```

PREPARATION OF GLYCOSYLTRANSFERASE UGT76G1 MUTANT AND USE THEREOF

RELATED APPLICATION DATA

This application is a National Stage Application under 35 U.S.C. 371 of co-pending PCT application number PCT/CN2020/117818 designating the United States and filed Sep. 25, 2020; which claims the benefit of CN application Ser. No. 20/191,0918850.2 and filed Sep. 26, 2019 each of which is hereby incorporated by reference in its entirety.

TECHNICAL FIELD

The disclosure belongs to the field of biotechnology. More specifically, the disclosure relates to preparation of glycosyltransferase UGT76G1 mutant and use thereof.

BACKGROUND OF DISCLOSURE

Glycosylation is one of the most extensive modifications in the synthesis of natural products. Most glycosylation modifications is catalyzed by UDP dependent glycosyltransferase (UGT), which uses UDP activated sugars as glycosyl donors to specifically transfer glycans to the glycosylation sites of receptor molecules.

Glycosylation can significantly alter the solubility, stability, toxicity and physiological activity of natural products. At the same time, the use of glycosylation modification is one of the important means to develop the chemical diversity of natural products. The glycosylation of flavonoids are abundant, which usually occur at 7-OH and 3-OH of aglycones. Diglycoside and polyglycoside are often reported. In the large family of plant natural products, flavonoids have always been paid more attention. Flavonoids, as active ingredients in Chinese herbal medicine, have various effects such as anti-cancer, anti-inflammatory, anti-oxidation, anti-pathogenic infection, and protection of the cardiovascular system. More than 10,000 flavonoid natural products have been identified, mainly found in various vegetables, fruits, plant stems and seeds.

Isoorientin is a C-glycosylated flavone with the core compound of flavonoid luteolin, which exists in the flowers and leaves of monocotyledonous plants rice, corn, bamboo, and dicotyledonous legumes, gentianaceae plants. In grasses, C-glycosylated flavones with isoorientin as the parent compound have been reported to have functions such as anti-insect and anti-ultraviolet. There are few reports of glycosyltransferases for glycosylation of isoorientin. An oxoglycosyltransferase UGT91L1 has been isolated from maize, which can add rhamnosyl at C-glycosyl 2 of isoorientin.

It is urgently needed to find a glycosyltransferase that can efficiently glycosylate isoorientin, to develop some new compounds with effects such as anti-insect and anti-ultraviolet, which can be useful in agriculture and the like.

SUMMARY OF DISCLOSURE

The purpose of the present disclosure is to provide a glycosyltransferase UGT76G1 mutant, preparation method and use thereof.

In the first aspect of the present disclosure, a glycosyltransferase UGT76G1 mutant is provided, comprising (1) a protein of amino acid sequence corresponds to SEQ ID NO: 1, with a mutation at residue 87, 199, 204 or 379; (2) the conservative variant of the protein of (1), in which the amino acids corresponding to residue 87, 199, 204 or 379 of SEQ ID NO: 1 are the same as those mutated at the corresponding position of the protein of (1).

In a preferred embodiment, the conservative variant includes: (a) a protein derived from the protein of (1), which has one or more (such as 1-20; preferably 1-15; more preferably 1-10, such as 5, 3) amino acids deleted, substituted, or inserted in the sequence, and still has the function of the protein of (1); (b) a protein derived from the protein of (1), which has more than 80% (preferably more than 85%; more preferably more than 90%; more preferably more than 95%, such as 98%, 99%) sequence identity with the amino acid sequence of the protein of (1), and still has the function of the protein of (1); or (c) the active fragment of the protein of (1), which contains the structure interacting with the glycosyl donor or glycosyl receptor in the spatial structure of glycosyltransferase UGT76G1, and still has the function of the protein of (1).

In another preferred embodiment, the residue at position 87, 199, 204 or 379 is mutated to a residue having a side chain group of aromatic ring, preferably to Phe or Trp.

In another aspect of the present disclosure, an isolated polynucleotide encoding the glycosyltransferase UGT76G1 mutant is provided.

In another aspect of the present disclosure, a vector is provided, which contains the polynucleotide.

In another aspect of the present disclosure, a genetically engineered host cell is provided, which contains the vector or has the polynucleotide integrated in the genome.

In a preferred embodiment, the host cell may include a prokaryotic cell or a eukaryotic cell; preferably, the prokaryotic cell includes *Escherichia coli* or *Bacillus subtilis*, or the eukaryotic cell includes a fungal cell, a yeast cell, an insect cell or a mammalian cell.

Another aspect of the present disclosure provides a method for producing the glycosyltransferase UGT76G1 mutant, comprising the steps of: (1) culturing the host cell to obtain a culture; and (2) isolating the glycosyltransferase UGT76G1 mutant from the culture.

In another aspect of the disclosure, a method of improving the catalytic activity of glycosyltransferase UGT76G1 is provided, comprising: mutating the amino acid of its sequence, wherein the amino acid corresponds to residue 87, 199, 204 or 379 of SEQ ID NO: 1.

In a preferred embodiment, the catalytic activity is statistically significantly increased, such as by more than 20%, more than 40%, more than 60%, more than 70% or higher.

In another preferred embodiment, the residue at position 87, 199, 204 or 379 is mutated to a residue having a side chain group of aromatic ring, preferably to Phe or Trp.

In another preferred embodiment, improving the catalytic activity of the glycosyltransferase UGT76G1 is to improve the catalytic activity to glycosylate a flavonoid.

In another preferred embodiment, the flavonoid (substrate) is a compound having the following core structure:

In another preferred embodiment, the flavonoid includes: isoorientin, orientin, apigenin, luteolin and the like.

In another aspect of the disclosure, a method of improving glycosylation of a flavonoid is provided, comprising conducting catalyzation via the glycosyltransferase UGT76G1 mutant; preferably, the glycosylation comprises: adding 1 to 3 (preferably 1 to 2) glycosyls in the flavonoid.

In another aspect of the disclosure, use of the glycosyltransferase UGT76G1 mutant for catalyzing glycosylation of a flavonoid is provided; preferably, the glycosylation comprises: adding 1 to 3 (preferably 1 to 2) glycosyls in the flavonoid.

In another aspect of the present disclosure, a composition for glycosylating a substrate is provided, which comprises the glycosyltransferase UGT76G1 mutant; or the host cell.

In another preferred embodiment, the composition also includes a pharmaceutically or industrially acceptable carrier.

In another aspect of the present disclosure, a kit for glycosylating a substrate is provided, which comprises the glycosyltransferase UGT76G1 mutant; or the host cell; or the composition.

Other aspects of the disclosure will be apparent to those skilled in the art based on the disclosure herein.

DETAILED DESCRIPTION

Upon in depth research, the inventor mutated key amino acid residues in the substrate binding pocket of UGT76G1, and explore UGT76G1 mutants that improve the catalytic activity of flavonoids. Here the inventor revealed a group of glycosyltransferase UGT76G1 mutants which have residues at particular positions mutated to amino acid residues with aromatic ring side chain substituents, especially G87F, I199F, L204F. The mutants have significantly improved conversion activity for flavonoid substrates.

As used herein, unless otherwise specified, the "glycosyltransferase UGT76G1 mutant" and "mutated glycosyltransferase UGT76G1" can be used interchangeably, which refer to the polypeptide after mutation near the substrate binding pocket corresponding to the wild-type glycosyltransferase UGT76G1. Preferably, the polypeptide is formed after mutation at position 87, 199 or 204 of the sequence.

The wild-type glycosyltransferase UGT76G1 can be refered as "a protein of amino acid sequence of SEQ ID NO: 1", or "a functional variant or active fragment of the protein". Preferably, the wild-type glycosyltransferase UGT76G1 is derived from *Stevia rebaudiana*. However, it should be understood that the invention also encompasses UGT76G1 homologues from other plants with homology and the same function.

As used herein, "isolated glycosyltransferase UGT76G1" means that the glycosyltransferase UGT76G1 mutant substantially contains no other naturally related proteins, lipids, carbohydrates or other substances. The skilled in the art can purify the glycosyltransferase UGT76G1 mutant by standard protein purification technology. Substantially pure protein can produce a single main band on non-reducing SDS-PAGE.

As used herein, "substrate binding pocket" refers to the position where the glycosyltransferase UGT76G1 interacts (binds) with the substrate in the spatial structure.

The protein of the invention can be a recombinant protein, a natural protein, a synthetic protein, preferably a recombinant protein. The protein of the invention can be a naturally purified product, or a chemically synthesized product, or can be produced by prokaryotic or eukaryotic hosts (such as bacteria, yeast, higher plants, insects and mammalian cells) using recombination technology.

The invention also includes fragments, derivatives and analogues of the glycosyltransferase UGT76G1 mutant. As used herein, the terms "fragments", "derivatives" and "analogues" refer to proteins that basically maintain the same biological function or activity of the natural glycosyltransferase UGT76G1 mutant of the invention. Functional fragments, derivatives or analogs in the disclosure may be (i) proteins with one or more conservative or non-conservative amino acid substitution (preferably conservative), where the substituted amino acid residues may or may not be one encoded by the genetic code, or (ii) a polypeptide having substituent groups in one or more amino acid residues, or (iii) proteins formed by having said protein fused with additional amino acid sequence (such as leader sequence or secretory sequence, or sequence used for purification of the protein or proprotein sequence, or fusion protein). In accordance with the teachings provided herein, these fragments, derivatives and analogs are well known to a person skilled in the art. However, the mutation disclosed herein, the amino acid mutation near the substrate binding pocket in protein's spatial structure, must exist in the amino acid sequence of the glycosyltransferase UGT76G1 mutant and its fragments, derivatives and analogues; preferably, the amino acid corresponding to residue 87, 199, 204 or 379 of SEQ ID NO: 1 is mutated.

As used herein, the "glycosyltransferase UGT76G1 mutant" further comprises but is not limited to: deletion, insertion and/or substitution of several (usually 1-20, preferably 1-10, more preferably 1-8, 1-5, 1-3, 1-2) amino acids, and addition or deletion of one or several (usually within 20, preferably within 10, more preferably within 5) amino acids at the C-terminal and/or N-terminal. For example, substitution with amino acids of comparable or similar properties usually does not change protein function in the art. As another example, addition or deletion of one or more amino acids to the C-terminus and/or N-terminus usually does not change the function of a protein either. The term also includes the active fragments and active derivatives of the glycosyltransferase UGT76G1 mutant. However, these variants should comprise the mutation described herein, i.e., the amino acid mutation near the substrate binding pocket in protein's spatial structure; preferably, the mutation occurs at amino acid corresponding to residue 87, 199, 204 or 379 of SEQ ID NO: 1.

In the present invention, the term "glycosyltransferase UGT76G1 mutant" also includes (but is not limited to): a derived protein having more than 80%, more preferably more than 85%, more preferably more than 90%, and further more preferably more than 95%, such as more than 98% and more than 99% sequence identity with the amino acid sequence of the glycosyltransferase UGT76G1 mutant and retaining the activity of the mutant. Similarly, these derived proteins should comprise the mutation described herein, i.e., the amino acid mutation near the substrate binding pocket in protein's spatial structure; preferably, the mutation occurs at amino acid corresponding to residue 87, 199, 204 or 379 of SEQ ID NO: 1.

The invention also provides a polynucleotide sequence encoding a glycosyltransferase UGT76G1 mutant of the invention or a conservative variant protein thereof.

The polynucleotide sequences herein can be in the form of DNA or RNA. Forms of DNA include cDNA, genomic DNA or artificially synthesized DNA. DNA can be single-stranded or double-stranded. The DNA may be coding strand or non-coding strand.

The polynucleotide encoding the mature protein of the mutant disclosed herein includes: the coding sequence only encoding the mature protein; the coding sequence encoding the mature protein and a various additional coding sequence; the coding sequence encoding the mature protein (and an optional additional coding sequence) and a noncoding sequence.

The term "polynucleotide encoding a/the protein" can include a polynucleotide encoding the protein, or a polynucleotide that further includes additional coding and/or non-coding sequences.

The disclosure also relates to vectors comprising the polynucleotide of the disclosure, as well as host cells genetically engineered using the vectors or coding sequences of the glycosyltransferase UGT76G1 mutant disclosed herein, and a method for producing the protein of the invention by recombination technology.

Through conventional recombinant DNA technology, the polynucleotide sequence of the invention can be used to express or produce the recombinant glycosyltransferase UGT76G1 mutant. Generally, there are the following steps:
(1) Transforming or transducing a suitable host cell with a polynucleotide (or variant) encoding a glycosyltransferase UGT76G1 mutant of the present invention, or with a recombinant expression vector containing the polynucleotide;
(2) culturing the host cell in a suitable medium;
(3) isolating and purifying proteins from the medium or cell.

In the invention, the polynucleotide sequence of glycosyltransferase UGT76G1 mutant can be inserted into the recombinant expression vector. The term "recombinant expression vector" refers to bacterial plasmid, phage, yeast plasmid, plant cell virus, mammalian cell virus or other vectors well known in the art. In short, any plasmid or vector can be used, provided that it can replicate and be stable in the host. An important charecterastic of an expression vector is that it usually contains an origin of replication, a promoter, a marker gene and a translation control element.

Suitable methods for constructing expression vector which comprises the coding DNA sequence of the glycosyltransferase UGT76G1 mutant and appropriate transcriptional/translational control signals are well known to the person skilled in the art. These methods include in vitro recombinant DNA technology, DNA synthesis technology, in vivo recombinant technology and so on. Said DNA sequence may be effectively linked to a proper promoter in the expression vector to direct mRNA synthesis. Expression vector further comprises a ribosome binding site for the initation of translation, and a transcription terminator. The expression vector preferably contains one or more selective marker genes to provide phenotypic traits for the selection of transformed host cells.

Vectors containing the above appropriate DNA sequences and appropriate promoters or regulatory sequences can be used to transform appropriate host cells so that they can express proteins.

In this disclosure, the host cells can be prokaryotic cells, such as bacterial cells; or lower eukaryotic cells, such as yeast cells; or higher eukaryotic cells, such as plant cells. Examples include *Escherichia coli, Bacillus subtilis, Streptomyces, Agrobacterium;* eukaryotic cells, such as yeast, plant cells, etc. In a specific embodiment of the invention, *Escherichia coli* is used as the host cells.

The choice of appropriate carrier, promoter, enhancer and host cells is evident to a person of ordinary skills in the art.

In a specific example of the present invention, the UGT76G1 mutant was expressed and purified in *E. coli:* the wild-type UGT76G1 gene was amplified from the cloning vector through PCR and subcloned into the protein expression vector pETDuet-1. Using the UGT76G1 gene expression vector as the template, the mutation was introduced by PCR primers, and the mutant protein expression vector was constructed using PCR amplification. The mutants that are sequenced to be correct were heterologously expressed in *E. coli* BL21(DE3). The protein was purified by Ni-NTA affinity chromatography and tested for enzyme activity in vitro, or applied to other aspects.

In a preferred embodiment, the flavonoid (substrate) is a compound having the following core structure:

In a preferred embodiment, the flavonoid (substrate) includes: isoorientin, orientin, apigenin, luteolin and the like.

Based on the information of the mutant glycosyltransferase UGT76G1 described herein, those skilled in the art know how to use the mutant to perform glycosylation of the compound having the core structure of flavonoid.

The enzyme activity of the glycosyltransferase UGT76G1 mutant can be detected by a technique known in the art. In a specific example of the present invention, the enzyme reaction system with the same conditions is used to detect the enzyme activity of different mutants in vitro. After the reaction, the product was detected by HPLC. The change of a mutant's catalytic activity was analyzed by comparing the relative conversion ratio of the flavonoid isoorientin by the mutant and the wild-type protein.

Compared with the prior art, the improved effect of the present invention is that the disclosed glycosyltransferase UGT76G1 mutants can efficiently and specifically catalyze the glycosylation of flavonoids in vitro. The glycosylation efficiency is significantly improved over the wide-type protein.

The glycosyltransferase UGT76G1 mutant of the present invention can be prepared in a pharmaceutically or industrially acceptable carrier to obtain a composition suitable for catalytic reaction or suitable for storage.

The glycosyltransferase UGT76G1 mutant of the present invention can also be prepared in a kit for ease of use or sale. Generally, the kit also includes instructions for use.

The disclosure is further illustrated by the specific examples described below. It should be understood that these examples are merely illustrative, and do not limit the scope of the present disclosure. The experimental methods without specifying the specific conditions in the following examples generally used the conventional conditions, such as those described in J. Sambrook, Molecular Cloning: A Laboratory Manual (3rd ed. *Science Press*, 2002) or followed the manufacturer's recommendation.

Materials and Instruments

PCR gel extraction kit and plasmid preparation kit were available from Axygen (U.S.).

PCR high-fidelity polymerase PrimeSTAR Max DNA Polymerase was purchased from Takara (Japan).

Restriction endonuclease and T4 ligase were purchased from New England Biolabs (NEB).

Seamless cloning kit was purchased from Vazyme Biotech Co., Ltd.

*E. coli* DH10B was used for cloning construction, BL21 (DE3) was used for protein expression.

Vector pETDuet-1 (Novagen) was used for gene cloning and protein expression.

Wild-type UGT76G1 and EUGT11 were synthesized by Genscript Biotechnology Co., Ltd. (NanJing) and optimized with *E. coli* codon.

Ni NTA was purchased from Qiagen (Germany).

Isoorientin standard was purchased from Dalian Meilun Biotechnology Co., Ltd. Other reagents are analytical grade reagent or chromatographic grade reagent, purchased from Sinopharm Chemical Reagent Co., Ltd.

IPTG, $MgCl_2$, PMSF and ampicillin were purchased from Sangon Biotech (Shanghai) Co., Ltd.

DNase I (10 mg/ml) was purchased from Shanghai yanye biotechnology service center.

PMSF was purchased from Sigma China.

Arktik Thermal Cycler (Thermo Fisher Scientific) was used for PCR.

Concentrator plus concentrator (Eppendorf) was used for vacuum concentration.

$OD_{600}$ was detected using UV-1200 spectrophotometer (Shanghai Mapada Instrument Co., Ltd.).

C3 high pressure cell crusher (Sunnybay Biotech Co., Canada) was used for cell broken.

Dionex UltiMate 3000 Liquid Chromatography System (Thermo Fisher Scientific) was used for HPLC.

Thermo Fisher Scientific electrostatic field orbitrap combined mass spectrometry Q Exactive was used for high-resolution mass spectra.

EXAMPLE 1. CONSTRUCTION OF WILD-TYPE UGT76G1 EXPRESSION VECTOR pQZ11

Amino acid sequence of wild-type UGT76G1:

>SrUGT76G1
(SEQ ID NO: 1)
MENKTETTVRRRRRIILFPVPFQGHINPILQLANVLYSKGFSITIFHTNF

NKPKTSNYPHFTFRFILDNDPQDERISNLPTHGPLAGMRIPIINEHGADE

LRRELELLMLASEEDEEVSCLITDALWYFAQSVADSLNLRRLVLMTSSLF

NFHAHVSLPQFDELGYLDPDDKTRLEEQASGFPMLKVKDIKSAYSNWQIL

KEILGKMIKQTKASSGVIWNSFKELEESELETVIREIPAPSFLIPLPKHL

TASSSSLLDHDRTVFQWLDQQPPSSVLYVSFGSSSEVDEKDFLEIARGLV

DSKQSFLWVVRPGFVKGSTWVEPLPDGFLGERGRIVKWVPQQEVLAHGAI

GAFWTHSGWNSTLESVCEGVPMIFSDFGLDQPLNARYMSDVLKVGVYLEN

GWERGEIANAIRRVMVDEEGEYIRQNARVLKQKADVSLMKGGSSYESLES

LVSYISSL*

The target gene was amplified with specific primer pairs (harboring BamHI and HindIII, Table 1) and with the codon-optimized UGT76G1 gene cloning vector as the template. The PCR product was ligated using T4 ligase into the vector pETDuet1 double digested by BamHI/HindIII. The resulted expression vector was verified as pQZ11 by sequencing.

TABLE 1

| Primers used in the construction of wild-type UGT76G1 expression vector | |
|---|---|
| Primer Name | Sequence |
| Primer_F | ATTCTGGATCCATGGAAAACAAAAC (SEQ ID NO: 6) |
| Primer_R | CGCAAGCTTTTAACTTTACAGAGAA (SEQ ID NO: 7) |

EXAMPLE 2. CONSTRUCTION OF MUTANTS G87F, I199F, L204F, L379W

After extensive and in-depth screening, the inventors focus on the following mutations:
Mutation of G at 87th to F;
Mutation of I at 199th to F;
Mutation of L at 204th to F;
Mutation of L at 379th to W.
The amino acid sequences of the key mutant enzymes are as follows:

>SrUGT76G1_G87F
(SEQ ID NO: 2)
MENKTETTVRRRRRIILFPVPFQGHINPILQLANVLYSKGFSITIFHTNF

NKPKTSNYPHFTFRFILDNDPQDERISNLPTHGPLAFMRIPIINEHGADE

LRRELELLMLASEEDEEVSCLITDALWYFAQSVADSLNLRRLVLMTSSLF

NFHAHVSLPQFDELGYLDPDDKTRLEEQASGFPMLKVKDIKSAYSNWQIL

KEILGKMIKQTKASSGVIWNSFKELEESELETVIREIPAPSFLIPLPKHL

TASSSSLLDHDRTVFQWLDQQPPSSVLYVSFGSSSEVDEKDFLEIARGLV

DSKQSFLWVVRPGFVKGSTWVEPLPDGFLGERGRIVKWVPQQEVLAHGAI

GAFWTHSGWNSTLESVCEGVPMIFSDFGLDQPLNARYMSDVLKVGVYLEN

GWERGEIANAIRRVMVDEEGEYIRQNARVLKQKADVSLMKGGSSYESLES

LVSYISSL*

>SrUGT76G1_I199F
(SEQ ID NO: 3)
MENKTETTVRRRRRIILFPVPFQGHINPILQLANVLYSKGFSITIFHTNF

NKPKTSNYPHFTFRFILDNDPQDERISNLPTHGPLAGMRIPIINEHGADE

LRRELELLMLASEEDEEVSCLITDALWYFAQSVADSLNLRRLVLMTSSLF

NFHAHVSLPQFDELGYLDPDDKTRLEEQASGFPMLKVKDIKSAYSNWQFL

KEILGKMIKQTKASSGVIWNSFKELEESELETVIREIPAPSFLIPLPKHL

TASSSSLLDHDRTVFQWLDQQPPSSVLYVSFGSSSEVDEKDFLEIARGLV

DSKQSFLWVVRPGFVKGSTWVEPLPDGFLGERGRIVKWVPQQEVLAHGAI

GAFWTHSGWNSTLESVCEGVPMIFSDFGLDQPLNARYMSDVLKVGVYLEN

GWERGEIANAIRRVMVDEEGEYIRQNARVLKQKADVSLMKGGSSYESLES

LVSYISSL*

>SrUGT76G1_L204F
(SEQ ID NO: 4)
MENKTETTVRRRRRIILFPVPFQGHINPILQLANVLYSKGFSITIFHTNF

NKPKTSNYPHFTFRFILDNDPQDERISNLPTHGPLAGMRIPIINEHGADE

LRRELELLMLASEEDEEVSCLITDALWYFAQSVADSLNLRRLVLMTSSLF

NFHAHVSLPQFDELGYLDPDDKTRLEEQASGFPMLKVKDIKSAYSNWQIL

KEIFGKMIKQTKASSGVIWNSFKELEESELETVIREIPAPSFLIPLPKHL

TASSSSLLDHDRTVFQWLDQQPPSSVLYVSFGSSSEVDEKDFLEIARGLV

DSKQSFLWVVRPGFVKGSTWVEPLPDGFLGERGRIVKWVPQQEVLAHGAI

GAFWTHSGWNSTLESVCEGVPMIFSDFGLDQPLNARYMSDVLKVGVYLEN

GWERGEIANAIRRVMVDEEGEYIRQNARVLKQKADVSLMKGGSSYESLES

LVSYISSL*

>SrUGT76G1_L379W
(SEQ ID NO: 5)
MENKTETTVRRRRRIILFPVPFQGHINPILQLANVLYSKGFSITIFHTNF

NKPKTSNYPHFTFRFILDNDPQDERISNLPTHGPLAGMRIPIINEHGADE

LRRELELLMLASEEDEEVSCLITDALWYFAQSVADSLNLRRLVLMTSSLF

NFHAHVSLPQFDELGYLDPDDKTRLEEQASGFPMLKVKDIKSAYSNWQIL

KEILGKMIKQTKASSGVIWNSFKELEESELETVIREIPAPSFLIPLPKHL

TASSSSLLDHDRTVFQWLDQQPPSSVLYVSFGSSSEVDEKDFLEIARGLV

DSKQSFLWVVRPGFVKGSTWVEPLPDGFLGERGRIVKWVPQQEVLAHGAI

GAFWTHSGWNSTLESVCEGVPMIFSDFGWDQPLNARYMSDVLKVGVYLEN

GWERGEIANAIRRVMVDEEGEYIRQNARVLKQKADVSLMKGGSSYESLES

LVSYISSL*

The mutant gene was amplified by PCR, with primers containing point mutation(s) (Table 2) and with wild-type UGT76G1 expression vector pQZ11 as a template. After digesting the template plasmid with Dpn I enzyme, the mutant gene was transformed into DH10B. Clones were selected and verified by sequencing.

TABLE 2

Primers used to amplify mutants

| Primer Name | Sequence |
| --- | --- |
| Primer_G87F_F | GGTCCGCTGGCGTTCATGCGTATCCCGATC (SEQ ID NO: 8) |
| Primer_G87F_R | GAACGCCAGCGGACCGTGGGTCGG (SEQ ID NO: 9) |
| Primer_I199F_F | GCGTACTCTAACTGGCAGTTCCTGAAAGAAATCCTGGG (SEQ ID NO: 10) |
| Primer_I199F_R | CTGCCAGTTAGAGTACGCAGATTTGATGTCTTTAAC (SEQ ID NO: 11) |
| Primer_L204F_F | GGCAGATCCTGAAAGAAATCTTCGGTAAAATGATCAAACAGACC (SEQ ID NO: 12) |
| Primer_L204F_R | CTTTCAGGATCTGCCAGTTAGAGTACGCAG (SEQ ID NO: 13) |
| Primer_L379W_F | CTTCTCTGACTTCGGTTGGGACCAGCCGCTGAACG (SEQ ID NO: 14) |
| Primer_L379W_R | ACCGAAGTCAGAGAAGATCATCGGAACACCTTCGC (SEQ ID NO: 15) |

EXAMPLE 3. MUTANT PROTEIN EXPRESSION AND PURIFICATION

The expression vector containing the mutant that was verified to be correct was transformed into *E. coli* expression host BL21(DE3). BL21 (DE3) harboring mutant expression vector was cultured overnight and transferred to 1 L LB (Ampicillin=100 μg/L) at 1% (v/v) and cultured at 37° C. and 200 rpm for 1 h to 2 h. Then, the bacteria were cultured at 16° C. and 160 rpm until $OD_{600}$=1.0. IPTG of final concentration 0.1 mM was used for induction, and the cells were collected after 18 to 20 hours of overnight culture. The cells were resuspended with Buffer A (20 mm Tris HCl, pH 8.0, 100 mM NaCl), added with 1 mM PMSF, 2 mM $MgCl_2$ and 5 μg/mL DNaseI and mixed well, than held on ice for 30 minutes. The cells were lysed by high-pressure cell crusher, and centrifuged at high speed (10000 rpm, 99 min). The supernatant was spin-incubated with 1 ml Ni-NTA purification resin (4° C., 1 h), and then eluted with 6-10 column volumes of 25 mM imidazole. Finally, 1 mL of 250 mM imidazole was used to incubate at 4° C. for 10-30 minutes to elute the target protein. The BSA method was used to determine the concentration of the target protein, which was stored in 50% glycerol (−20° C.). The mutant protein was used for enzyme activity test in vitro later.

EXAMPLE 4. ENZYMIC REACTION OF MUTANT IN VITRO

The enzymic reaction system (50 μL) includes: 5 μg protein, 1.5 mM UDP-glucose, 250 μM glycosyl acceptor substrate isoorientin, orientin, apigenin or luteolin, and Buffer A (20 mM Tris-HCl, pH=8.0, 100 mM NaCl). The reaction of each mutant protein for the same substrate was repeated three times. Reaction conditions: 37° C. overnight. The reaction was quenched with an equal volume of methanol. After vigorous shaking, the reaction was centrifuged at 12000 rpm for 30 min. The supernatant was used for HPLC detection. Detection method: mobile phase A (acetonitrile, containing 0.1% formic acid)—mobile phase B (water, containing 0.1% formic acid) gradient elution. Chromatographic conditions: gradient elution from initial 5% A to 50% A within 11 min, elution at 100% A for 4 min, and back to 5% A within 1 min for equilibration for 4 min. The peak area of the catalytic product of the mutant was calculated and compared with the peak area of the catalytic product of wild-type UGT76G1.

EXAMPLE 5. CATALYTIC ACTIVITY OF MUTANT

Figure 1:
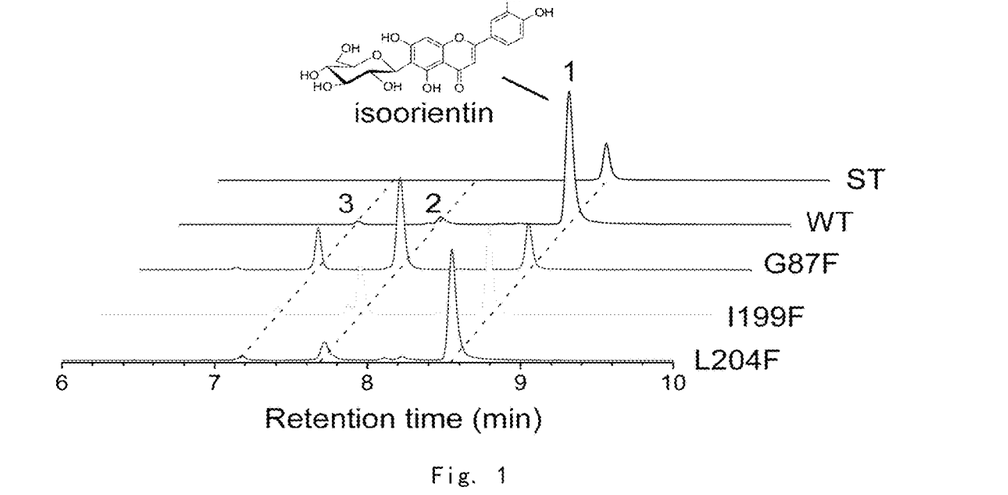
FIG. 1. Conversion of isoorientin by UGT76G1 wild-type and mutant. ST, isoorientin standard; WT, conversion reaction by wild-type UGT76G1; G87F, conversion reaction by UGT76G1 mutant G87F; I199F, conversion reaction by UGT76G1 mutant I199F; L204F, conversion reaction by UGT76G1 mutant L204F.
Figure 2:
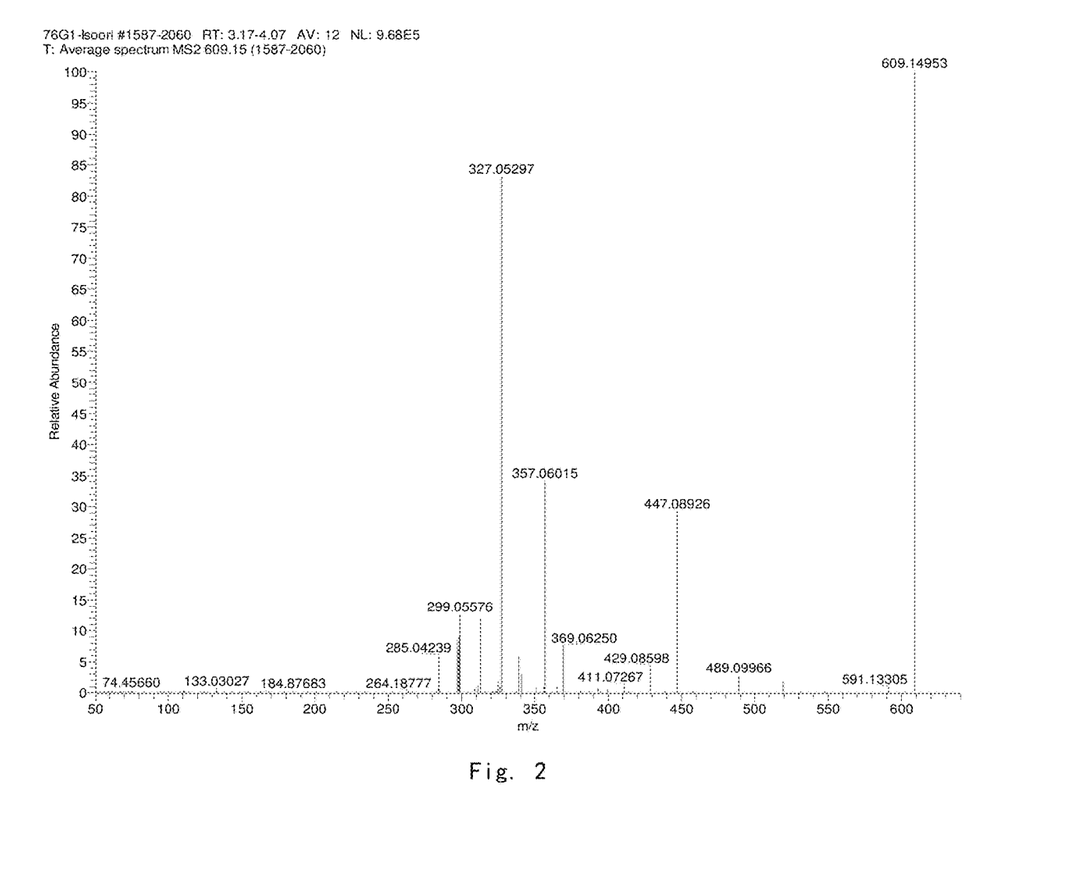
FIG. 2. MS/MS spectrum of compound 2.
Figure 3:
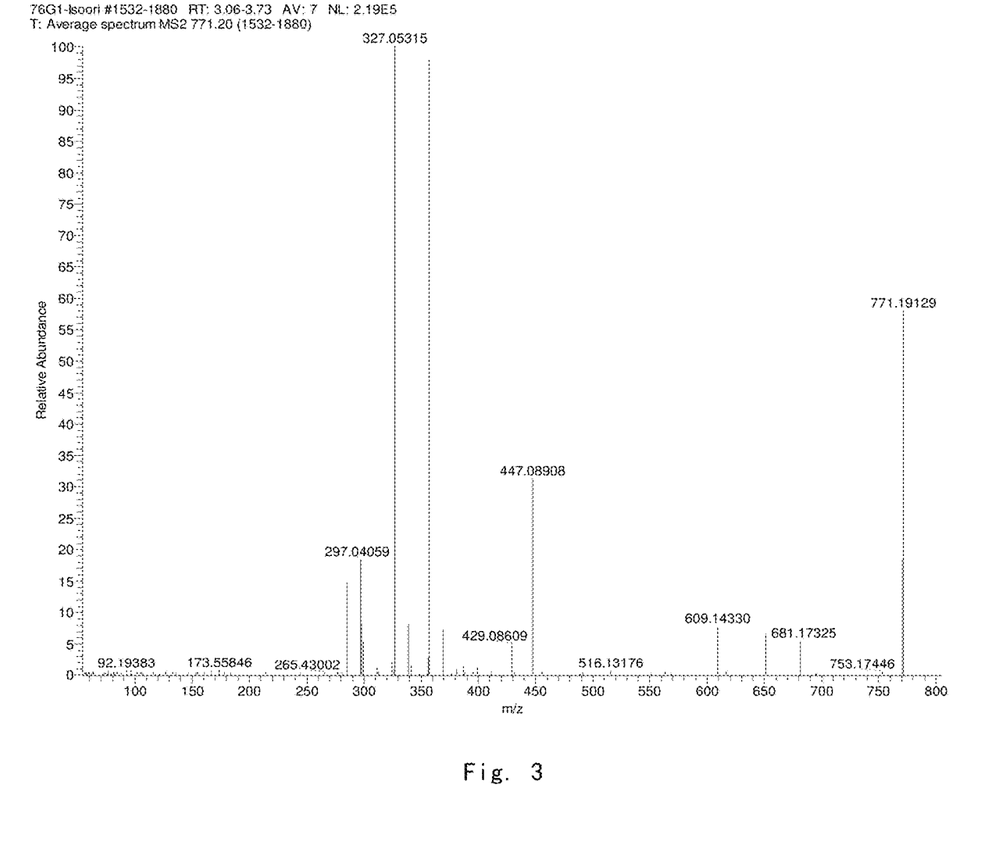
FIG. 3. MS/MS spectrum of compound 3.

HPLC analysis of FIG. 1 shows the in vitro functional verification results for the substrate isoorientin. The conversion efficiency of isoorientin (compound 1) by wild-type UGT76G1 is low, and the glycosylation products mainly include compound 2 and compound 3. The mutants had a significant promoting effect on the conversion of isoorientin, among which the conversion efficiency of G87F was relatively the highest. The secondary MS fragmentation information of compounds 2 and 3 (FIG. 2, FIG. 3) suggested that they are isoorientin-O-glucoside and isoorientin-O-diglucoside, respectively.

Figure 4:
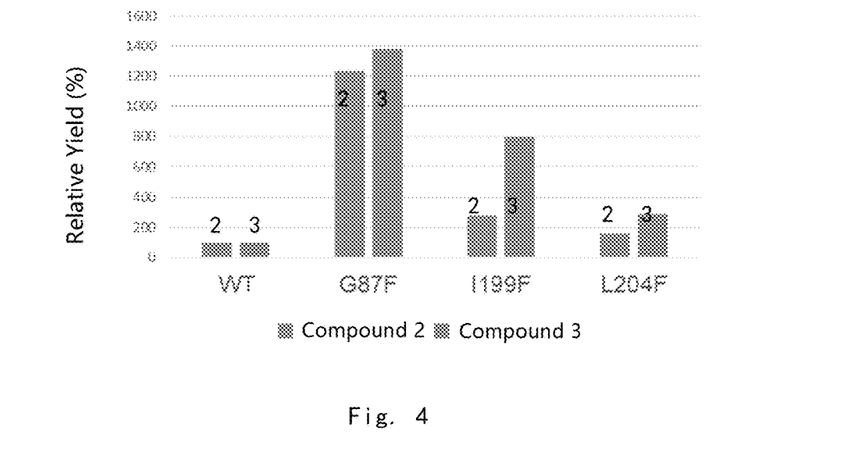
FIG. 4. The relative yields of the glycosylated products converted from isoorientin by the mutants G87F, I199F and L204F (100% for the wild type).

The glycosylation efficiency by mutants G87F, I199F, L204F was significantly increased, and the yield of compound 2 was greatly increased to 1381%, 799% and 285% as compared with the wild type; the yield of compound 3 was greatly increased to 1235%, 278% and 159% of the wild type (FIG. 4).

Figure 5:
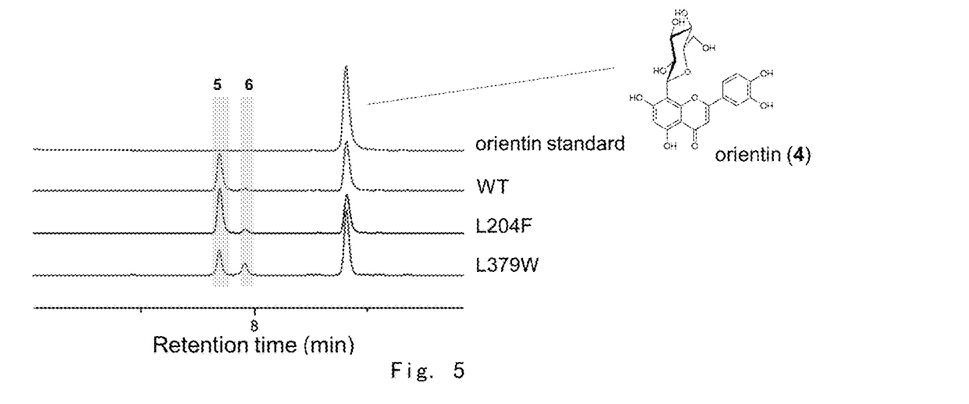
FIG. 5. Conversion of orientin by UGT76G1 wild-type and mutant.
Figure 6:
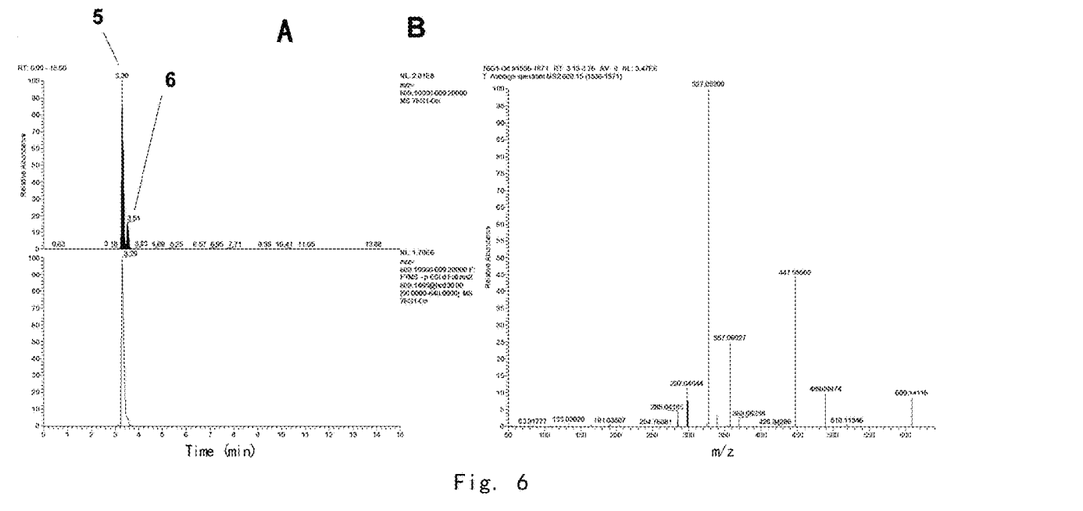
FIG. 6. LC-MS/MS spectrum of compound 5, 6. (A) [M-H]$^-$ selective ion current spectra of compounds 5 and 6; (B) quasi-molecular ion peak m/z 609.15 [M-H]$^-$ secondary fragmentation information.

HPLC analysis of FIG. 5 indicates the functional verification results for the substrate orientin (compound 4) in vitro. Wild-type UGT76G1 shows a certain conversion rate for orientin (compound 4), and the glycosylated products mainly include compound 5 and 6. The mutant L204F can increase the production efficiency of product 5, and the mutant L379W can increase the production efficiency of product 6. The LC-MS results of compounds 5 and 6 (FIG. 6) suggested that they are the two isomers of orientin-O-glucoside.

Figure 7:
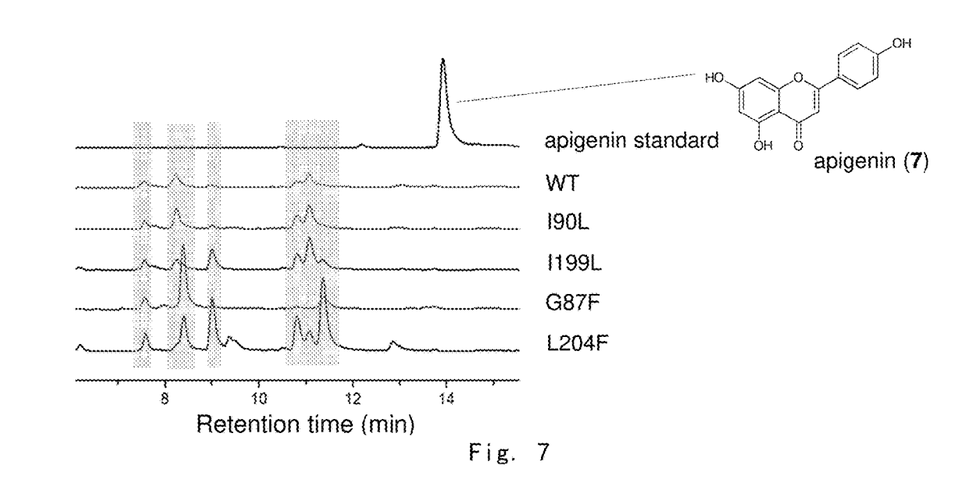
FIG. 7. Conversion of apigenin by UGT76G1 wild-type and mutant.

HPLC analysis of FIG. 7 indicates the in vitro functional verification of the substrate apigenin (compound 7). The glycosylation products of apigenin (compound 7) converted by mutants G87F, L204F are significantly different from those converted by wild-type (WT) or non-aromatic side chain mutants (I90L, I199L), suggesting that the glycosylation of the products occurs at different position.

Figure 8:
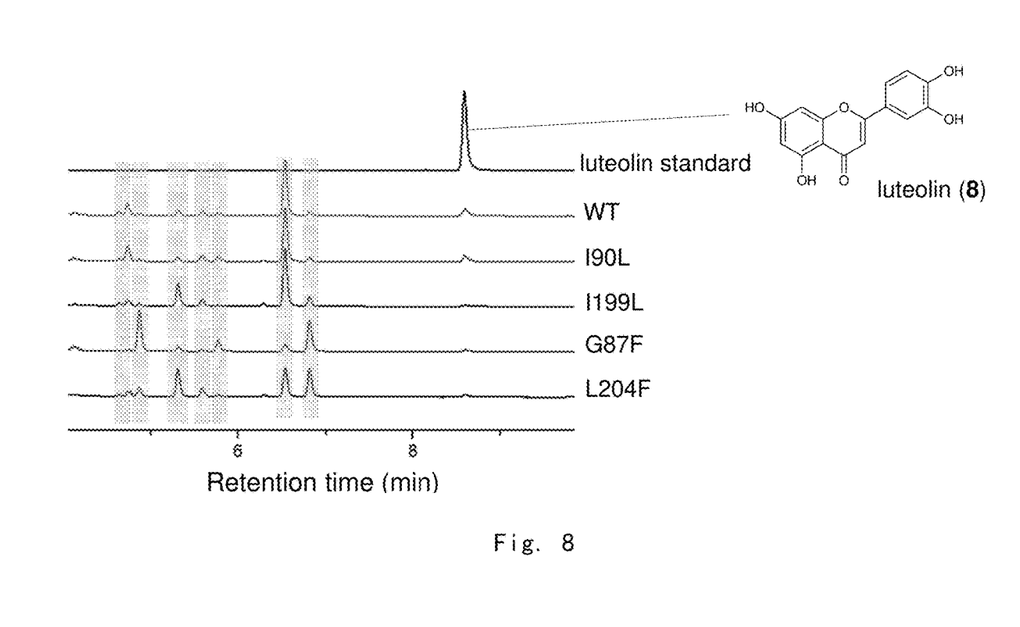
FIG. 8. Conversion of luteolin by UGT76G1 wild-type and mutant.

HPLC analysis of FIG. 8 indicates the in vitro functional verification of the substrate luteolin (compound 8). The glycosylation products of luteolin (compound 8) converted by mutants G87F, L204F are significantly different from those converted by wild-type (WT) or non-aromatic side chain mutants (I90L, I199L), which is presumed to be caused by the different glycosylation sites of the products.

Each reference provided herein is incorporated by reference to the same extent as if each reference was individually incorporated by reference. In addition, it should be understood that based on the above teaching content of the disclosure, those skilled in the art can practice various changes or modifications to the disclosure, and these equivalent forms also fall within the scope of the appended claims.

We claim:

1. A glycosyltransferase protein UGT76G1 comprising an amino acid sequence having at least 90% identity to SEQ ID NO: 1 having a mutation at one of positions 87 or 199, wherein the mutation is G87F or I199F.

2. An isolated polynucleotide, wherein the polynucleotide encodes the glycosyltransferase protein UGT76G1 according to claim 1.

3. A vector, comprising the polynucleotide according to claim 2.

4. A genetically engineered host cell, comprising a vector comprising the polynucleotide according to claim 2 or having the polynucleotide integrated in the genome of the genetically engineered host cell.

5. A method for preparing the glycosyltransferase protein UGT76G1 according to claim 1, comprising the steps of:
   (1) culturing a host cell comprising a polynucleotide encoding the glycosyltransferase protein UGT76G1 according to claim 1 to obtain a culture; and
   (2) isolating the glycosyltransferase protein UGT76G1 from the culture.

6. A method of improving the catalytic activity of a glycosyltransferase protein UGT76G1, comprising: mutating an amino acid of the sequence of the glycosyltransferase protein UGT76G1, wherein the glycosyltransferase protein UGT76G1 comprises an amino acid sequence having at least 90% identity to SEQ ID NO: 1, wherein the amino acid corresponds to one of positions 87 or 199 of SEQ ID NO: 1, and wherein the mutation is G87F or I199F.

7. The method according to claim 6, wherein improving the catalytic activity of the glycosyltransferase protein UGT76G1 is to improve the catalytic activity to glycosylate flavonoids.

8. A method of improving glycosylation of a flavonoid, comprising conducting catalysis via the glycosyltransferase protein UGT76G1 according to claim 1, wherein the flavonoid comprises isoorientin, apigenin, and luteolin.

9. The method according to claim 8, wherein the glycosylation comprises adding 1 to 3 glycosyls to the flavonoid.

10. The method according to claim 8, wherein the flavonoid comprises isoorientin, and wherein glycosylation of isoorientin produces isoorientin-O-glucoside, isoorientin-O-diglucoside, or orientin-O-glucoside.

11. A composition for glycosylating a substrate, wherein the composition comprises:
   the glycosyltransferase protein UGT76G1 according to claim 1; or
   a host cell comprising a polynucleotide encoding the glycosyltransferase protein UGT76G1 according to claim 1.

12. A kit for glycosylating a substrate, wherein the kit comprises:
   a host cell comprising a polynucleotide encoding the glycosyltransferase protein UGT76G1 according to claim 1; or
   a composition comprising the glycosyltransferase protein UGT76G1 according to claim 1, or a host cell comprising a polynucleotide encoding the glycosyltransferase protein UGT76G1 according to claim 1.

* * * * *